US 6,918,579 B2

(12) United States Patent
Ponzio et al.

(10) Patent No.: US 6,918,579 B2
(45) Date of Patent: Jul. 19, 2005

(54) WORKPIECE CARRIER FOR PRODUCTION LINES, OR PALLET, WITH ADJUSTABLE SUPPORTS

(75) Inventors: Massimo Ponzio, Barberino V. Elsa (IT); Rubino Corbinelli, Poggibonsi (IT)

(73) Assignee: ATOP S.p.A., Florence (IT)

( * ) Notice: Subject to any disclaimer, the term of this patent is extended or adjusted under 35 U.S.C. 154(b) by 0 days.

(21) Appl. No.: 10/406,183

(22) Filed: Apr. 3, 2003

(65) Prior Publication Data

US 2003/0193124 A1 Oct. 16, 2003

(30) Foreign Application Priority Data

Apr. 10, 2002 (EP) ............................................ 02425220

(51) Int. Cl.[7] ................................................ B65G 47/00
(52) U.S. Cl. ..................................................... 269/309
(58) Field of Search ............................ 269/55, 45, 71, 269/73, 296, 309

(56) References Cited

U.S. PATENT DOCUMENTS

| | | | | |
|---|---|---|---|---|
| 1,792,612 A | * | 2/1931 | Staley | ........................ 269/296 |
| 5,348,142 A | | 9/1994 | Nishimura et al. | |
| 5,540,376 A | | 7/1996 | Asla et al. | |
| 5,799,912 A | | 9/1998 | Ponzio et al. | |

* cited by examiner

Primary Examiner—Robert C. Watson
(74) Attorney, Agent, or Firm—Simpson & Simpson, PLLC

(57) ABSTRACT

A workpiece carrier for automatic production lines, or pallet (1), having at least a couple of support elements (15,16) for workpieces (20), held by two reference bars (3), fixed to the pallet (1), and by two fastening bridges (4) of orthogonal to the bars (3). The bridges (4) have a central portion, on which the support elements are connected (15, 16), and two ends (4'), suitable for a positive engagement (3', 6) with the bars (3). The distance between the support elements (15,16) is adjustable raising one of the bridges (4), moving it to another position and lowering it again for completing the positive engagement (3', 6) with the bars (3) in the new position.

31 Claims, 5 Drawing Sheets

WORKPIECE CARRIER FOR PRODUCTION LINES, OR PALLET, WITH ADJUSTABLE SUPPORTS

CROSS REFERENCE TO RELATED APPLICATIONS

This non-provisional patent claims priority under 35 U.S.C. §119 to European Patent Application No. EP 02425220.7, which application was filed on Apr. 10, 2002.

FIELD OF THE INVENTION

The present invention relates to an equipment for automatic production lines and more precisely it relates to a workpiece carrier, or pallet, with variable distance support members for holding workpieces of different size through such lines. Furthermore, the invention relates to a method for automatic adjustment of the distance between the supports.

BACKGROUND OF THE INVENTION

Automatic production lines are known where the workpieces are arranged on workpiece carriers, known in the field as pallets and hereinafter thus indicated, which hold them and carry them through one or several workstations. An example of workpieces is an armature for an electric motor.

More precisely, each pallet, that is initially located in a station of inlet for receiving a workpiece, proceeds on a conveyor belt that causes it to move selectively through the workstations. In each station, if necessary, the workpiece is offered to a machine that draws it from the pallet, works it and returns it again on the pallet that proceeds on the conveyor. During the working time of the workpiece in a station, the pallet continues to rest on the conveyor belt located underneath, for example of the belt type, in sliding contact on the belt same, or it can be raised or withdrawn from the conveyor belt, for example put in a waiting station. At the end of the work cycle, the pallet is withdrawn or maintained on the conveyor belt because it can proceed up to a next workstation.

Alternatively to the above, the workpiece can be worked directly on the pallet, which is being kept still on the conveyor belt or, as above described, raised or withdrawn from the latter.

Production lines that are not flexible exist, i.e, prepared to operate on workpieces having all the same size or workpiece families of substantially alike size. In this case, at the start-up of the line the pallets are set for receiving the workpieces and are not modified up to the end of all the working period. When the size of the workpieces is modified in a substantial way, the line is stopped and both the pallet and the machines are set for receiving and working the new workpieces.

When, instead, the machines in the various stations of the line are of flexible type, i.e., they can be adapted quickly to operate with workpieces of different size, also the pallet, therefore, must be adjusted in real time not much before receiving each workpiece.

Manually adjustable pallets exist, like in EP267324, that comprise fixed supports that can be adjusted and then blocked in a precise position for receiving the workpiece. A pallet manually adjustable of traditional type, requires that the supports are loosened, for example by means of screw coupling, in order to move them to a position in which they are then are locked to steadily support the workpiece.

Pallets with automatically adjustable supports are also known. For example, in EP 348715 a pallet is described for armatures of electric motors having a couple of V-supports that receive the shaft ends of the armature. The V-supports are mounted by means of sliding coupling on guides integral to the pallet. Means are provided for moving the supports along the guide, such as a worm screw, that can be operated automatically in many ways in an adjustment station. In all the various embodiments presented, however, the pallet is structurally complex and heavy to make, and requires complex means for adjusting.

In IT 5107/A/89 a similar pallet is described for armatures of electric motors with variable distance support members along with the relative means for adjusting.

In EP 447805 a pallet is shown for armatures of electric motors having a much easier substantially frame-shaped structure defining a central aperture. On the frame a T-guide is mounted with which support arms slidingly engage having a V-shaped end for receiving the workpiece.

In EP 811463, finally, a pallet is described for armatures of electric motors with supports adjustable both manually, made quickly by an operator, and automatically by a robotized manipulation device. In fact, in the case of production lines of small and medium size, an automatic adjustment station of the distance between the supports may be not necessary, whereas on very flexible lines it can be required.

EP 811463, however, provides cantilever support arms mounted on a support bar, whereby the armatures bear with all their weight on the fastening ends of the arms to the bar. Also EP 348715 and EP 447805 have cantilever supports with respect to a guide, whereby the moment of the weight of the armature bears on the guide.

SUMMARY OF THE INVENTION

It is an object of the present invention to provide a pallet for automatic production lines having support elements with variable distance that can be easily located in predetermined points, and that share the weight on two bearing elements.

It is another object of the present invention to provide a pallet that can adapt without any change to work both on a line with automatic adjustment station and on a line with manual adjustment of the support distance.

It is a further object of the present invention to provide a pallet whose parts are easily and independently replaceable.

These and other objects are achieved by the workpiece carriers for automatic production lines, or pallets, according to the invention, having at least a couple of support elements for workpieces, whose main characteristic is that it comprises two reference bars and two fastening bridges substantially orthogonal to the bars. Such bridges have a central portion on which the support elements are connected and two ends suitable for engaging with a positive engagement on the bars. The distance between the support elements is adjustable raising at least one of the bridges from the bars, moving it to another position and lowering it again for completing the positive engagement with the bars in the new position.

In particular, the reference bars have an inclined surface, and the bridges have ends with inclined faces, whereby the positive engagement is achieved when the inclined faces of the bridges and the inclined surfaces of the bars match with each other.

Preferably, the reference bars have a surface of engagement with protrusions and recesses, and the bridges have end faces also with protrusions and recesses, whereby the positive engagement is achieved with the engagement of said protrusions and recesses.

Said protrusions and recesses can be chosen among: knurled, toothed, embossed, ribbed surfaces, as well as pins and holes.

Advantageously, the bridges ends have opposed inclination as well as the surfaces of the bars have opposed inclination, whereby the matching of a bridge and two bars is substantially self-centring and allows a quick adjustment of the position of the bridges on the pallet.

Advantageously, the bridges have a raised central portion with respect to the pallet, whereby the workpieces are suspended above the pallet in order to accommodate workpieces of adjustable size.

Each bridge is provided with at least a magnet at one end that allows a solid fastening of it at the base of the pallet. Therefore, the presence of the magnet and of the positive engagement between the bars and the bridges ends assure a high steadiness of support of the workpiece that cannot move in a desired direction, allowing a precise grip by manipulating means located along the production line.

Advantageously, the pallet may have an apertured plate whereby the workpiece can be raised from below.

Advantageously, the pallet may have an apertured plate whereby the workpiece can be raised from below.

According to another aspect of the invention, a method for adjusting the position of support elements on workpiece carriers, or pallets, for automatic production lines, having at least a couple of said support elements, provides the steps of:

pre-arranging on the pallet a first and a second bar, parallel to each other and fixed to the pallet;

pre-arranging a first bridge and a second fastening bridge that in use are substantially orthogonal to the bars, the bridges having a central portion and two ends suitable to provide a positive engagement with the bars, assembling at least a first support element on the central portion of the first bridge and at least a second support element on the central portion of the second bridge, arranging the first and second bridge parallel to each other at a predetermined distance, with ends in a positive engagement with the bars, adjusting the distance between the support elements raising at least one of the bridges from the bars, moving it to another position and lowering it again for completing the positive engagement with the bars in the new position.

BRIEF DESCRIPTION OF THE DRAWINGS

Further characteristics and advantages of the equipment according to the present invention will be made clearer with the following description of an embodiment thereof, exemplifying but not limitative, with reference to the attached drawings, wherein.

DESCRIPTION OF A PREFERRED EMBODIMENT

Figure 1:
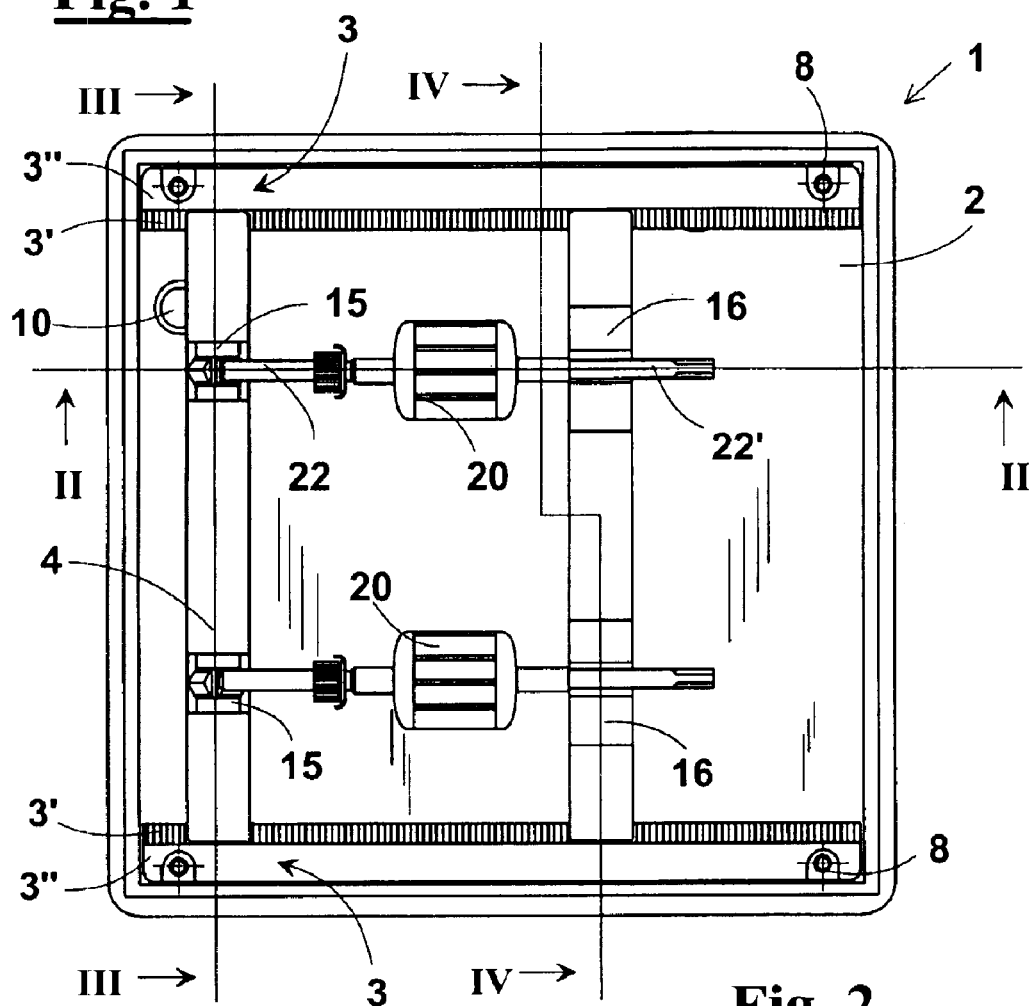
FIG. 1 shows a top plan view of a pallet according to the invention.
Figure 2:
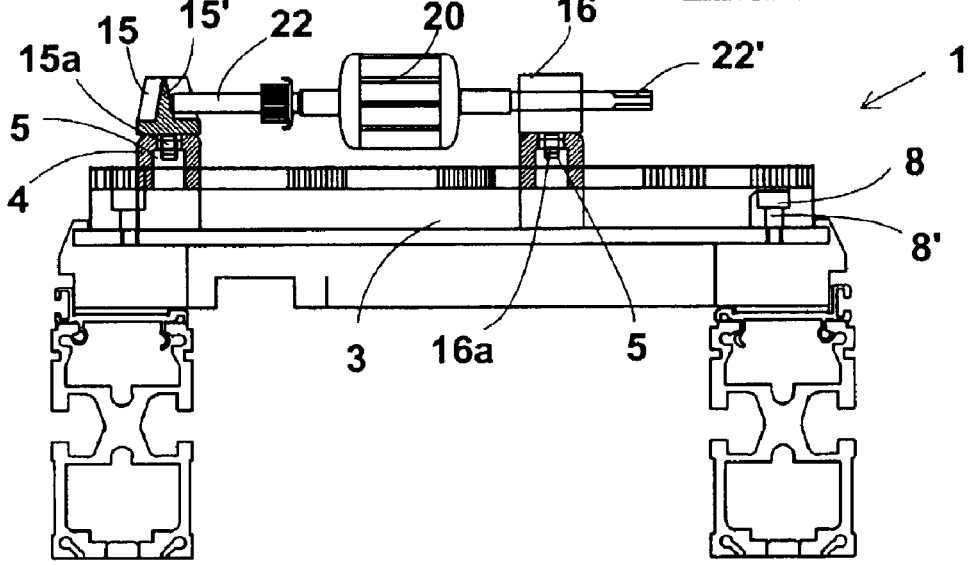
FIG. 2 shows in a longitudinal cross section view according to arrows II—II the pallet of FIG. 1.

With reference to FIGS. 1 and 2, a workpiece carrier for automatic production lines, or pallet 1, comprises a base having a substantially rectangular shape and made of light material, for example resin, reinforced by a metal plate 2. To plate 2 are fastened, by means of screws 8 engaging in holes 8', two reference bars 3. As better shown in FIGS. 5 and 6 reference bars 3 have a first inclined face 3' and a second inclined face 3" directed towards opposite sides.

Always with reference to FIGS. 1 and 2, on reference bars 3 of pallet 1 are arranged two bridges 4 to which two couples of support elements 15 and 16 are connected for workpieces 20, in particular armatures for electric motors.

Figure 5:
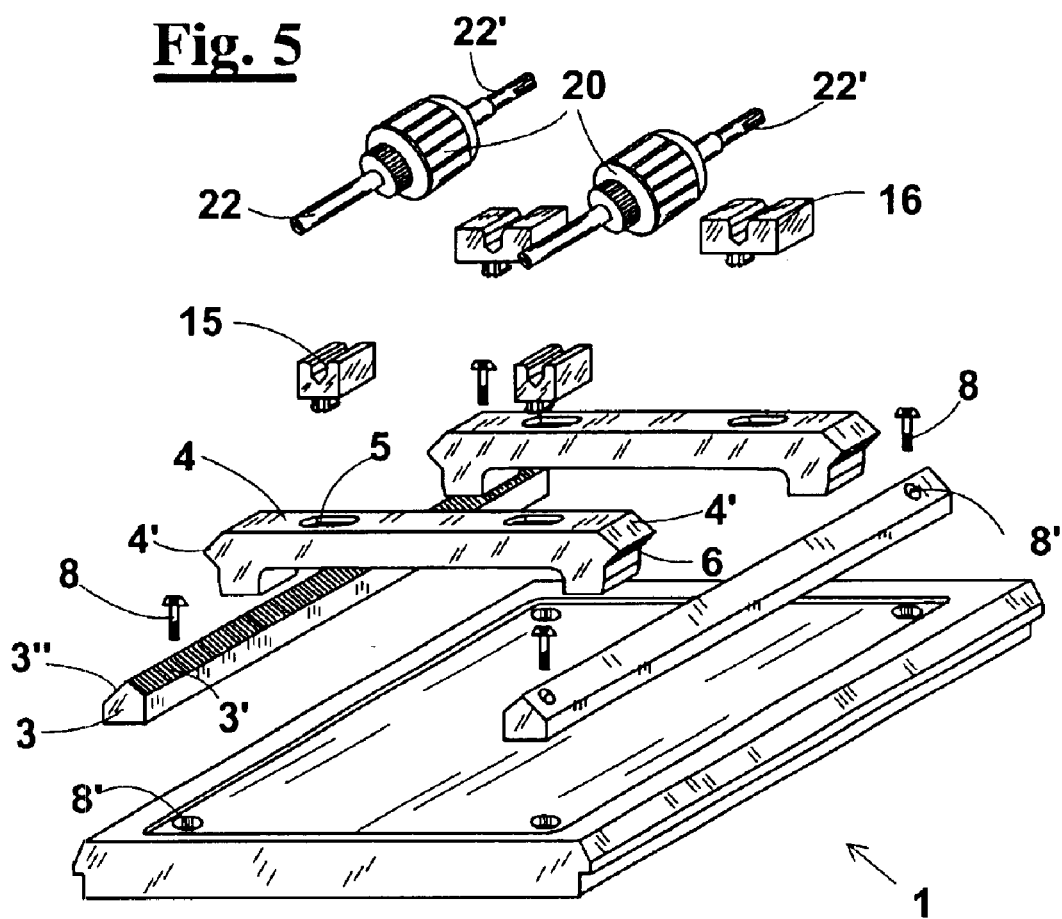
FIGS. 5 and 6 show respectively in an exploded view and after assembling the pallet of FIG. 1.
Figure 6:
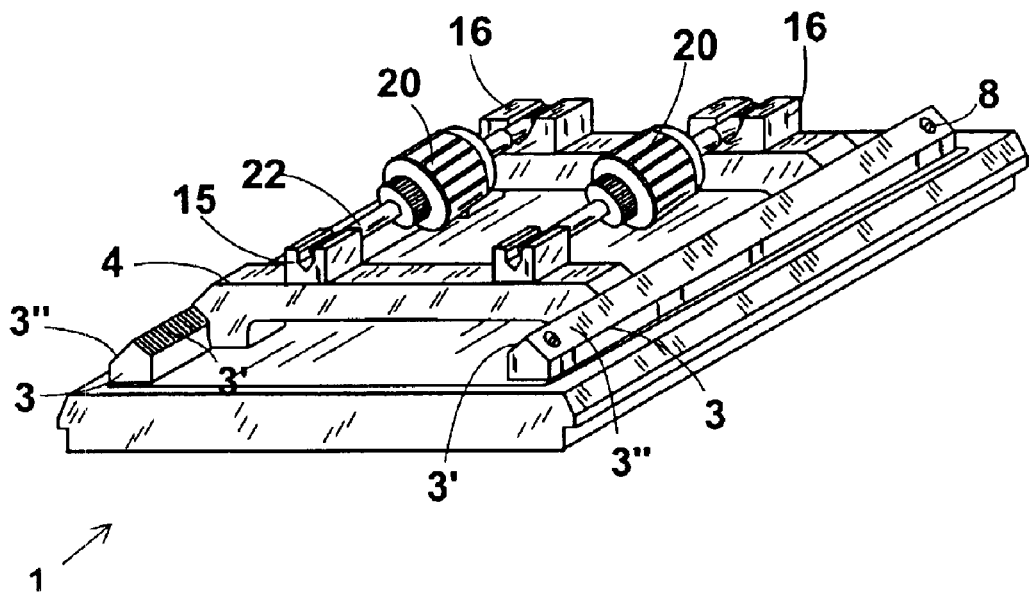

Support elements 15 and 16 have V-cross section suitable for supporting portions 22 and 22' of the shaft of an armature 20. According to an embodiment, as shown in FIGS. 5 and 6, support elements 15 that receive the portion 22 of the shaft are smaller than support elements 16, suitable for receiving portion 22' of shaft, and the respective shapes of the support elements vary according to the workpiece 20 to support.

Support element 16 is, in the present example, provided with V-cross section, but may have whichever shape, according to the workpiece.

Each support element 15 and 16 can engage with hole 5 of bridge 4 by means of snap engagements 15a and 16a. This solution allows the selective replacement of supports 15 and 16, using always the same bridges, in order to choose the most suitable for the workpiece.

Supports 15, and also supports 16, have shoulders 15' (FIG. 2) onto which shaft ends 22 rest in order to allow to the machine that draws workpiece 20 away from pallet 1 to know exactly its position.

End 4' of bridges 4 have an inclined face 6 knurled or worked in other way with protrusions and recesses, whereby the bridge, in use, rests against bar surface 3', which is also knurled or correspondingly worked, substantially to provide a positive engagement, which allows a precise location and prevents wrong translations. Furthermore, end 4' of bridges extend towards below, forming a reference against the side faces of bars 3 and for housing a permanent magnet 7, which allows fastening of bridge 4 to plate 2 and to pallet 1. End 4' extends towards below for a length suitable for causing magnet 7 to fasten bridge 4, but cannot support the weight of bridge 4, which bears completely on bars 3.

Alternative to a magnet, other fastening means of bridges 4 to bars 3 can be provided, among which for example, in a way not shown but easily implementable by a man of the art, pushing elements like spring loaded balls, pins or rollers enganging in corresponding recesses provided in said bars 3 and said ends 4' of bridges 4; as well as reversible snap engagement elements, etc.

Protrusions and recesses 3' of bars 3 and the corresponding protrusions and recesses 6 of bridges 4 can advantageously be distanced of a known pitch, for example 0.5 mm or 1 mm, in order to allow easily a Measure Of The Distance between two bridges 4. This distance can be determined with aid of a scale, mounted or printed on the bars in case of manual adjustment, or by means of optical counting of protrusions and recesses, in case of automatic adjustment.

Figure 3:
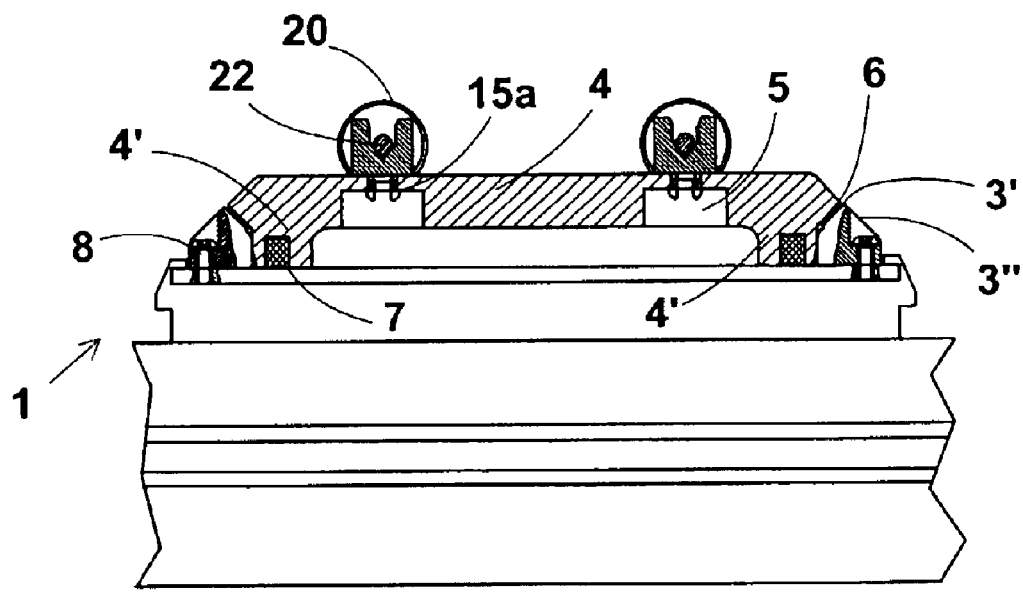
FIG. 3 shows in cross sectional view according to arrows III—III the pallet of FIG. 1.
Figure 4:
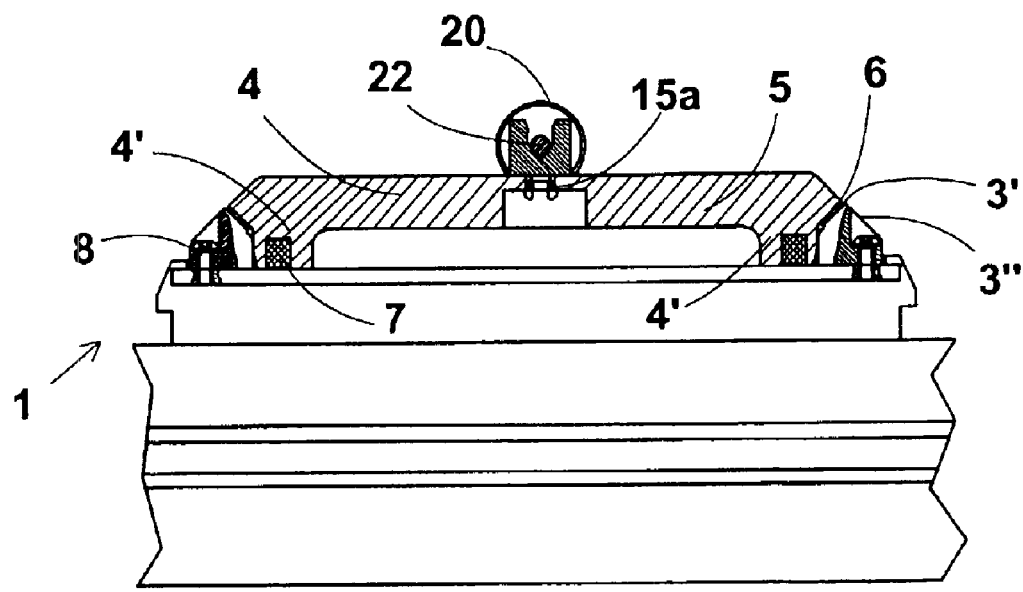
FIG. 4 shows in cross sectional view according to arrows IV—IV the pallet of FIG. 1.

Always in FIGS. 3 and 4 is shown how the raised central portion of bridges 4 allows to keep workpieces 20 suspended above pallet 1 in order to accommodate workpieces 20 of different size. This is advantageous for housing workpieces of different vertical encumbrance, allowing, for example, to house armatures of large diameter.

Plate 2 has furthermore, holes 10 of reference for blocking pins, one of which is shown in FIG. 1 and holes 8' for fastening screws 8 of bar 3.

FIGS. 5 and 6 show pallet 1, according to the invention, substantially with parts that can be easily assembled. This structure allows, on one hand, the replacement of single parts, in case of need, and on other hand, to change very easily the position according to the size of workpiece 20.

Figure 7:
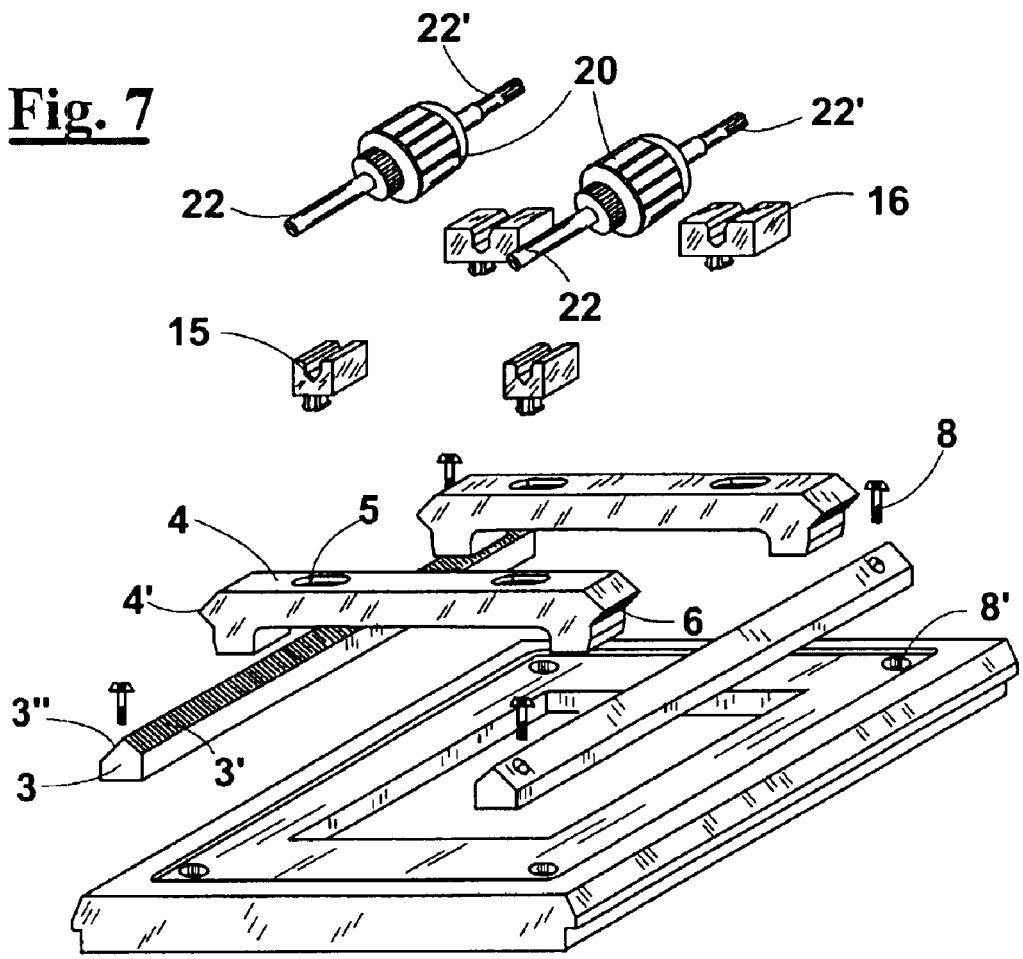
FIGS. 7 and 8 show respectively in an exploded view and after assembling an alternative embodiment of the pallet of FIG. 1.
Figure 8:
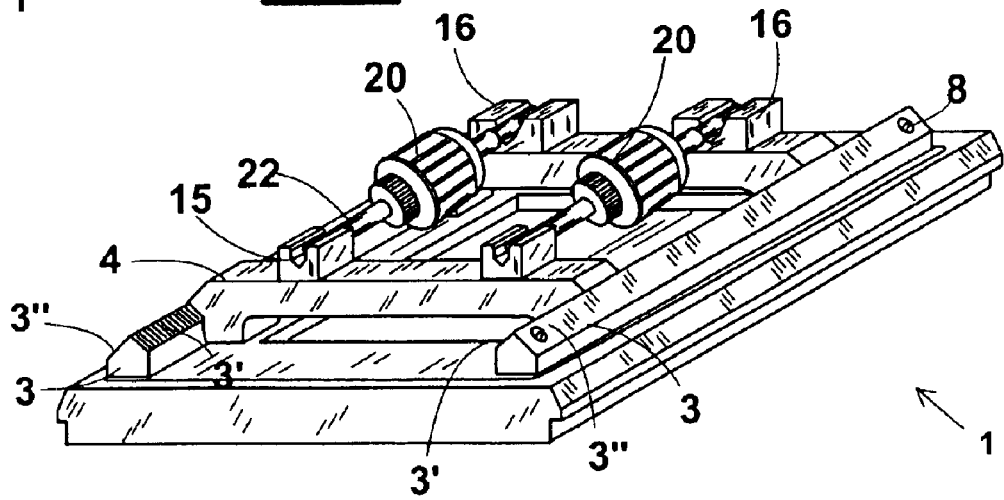

An alternative embodiment of pallet 1 is shown in FIGS. 7 and 8 and provides that plate 2 has an aperture 9 for having a lighter pallet 1 and to allow lifting of workpieces 20 from below.

Figure 9:
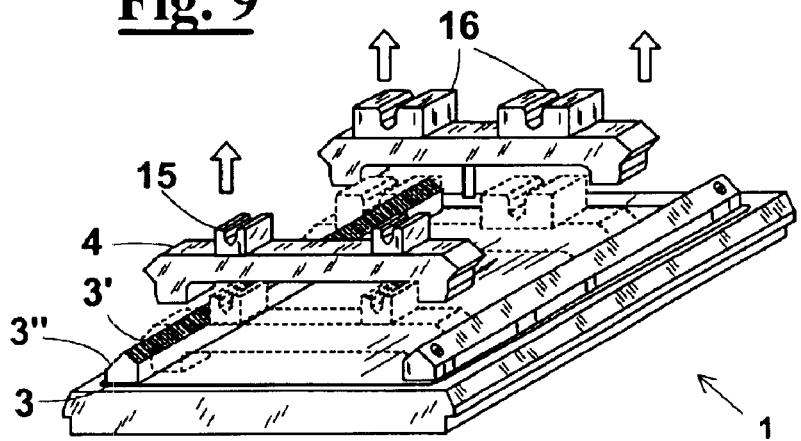
FIGS. 9 to 11 show diagrammatically the steps of adjusting the position of the bridges of the pallet according to the invention.
Figure 10:
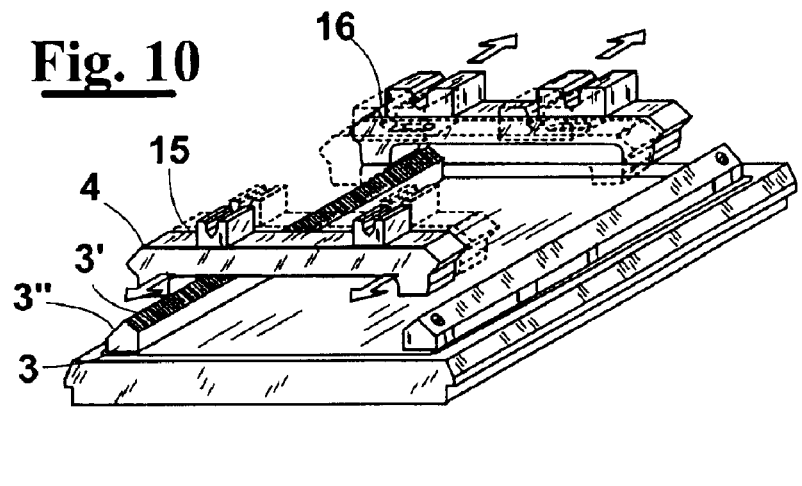
Figure 11:
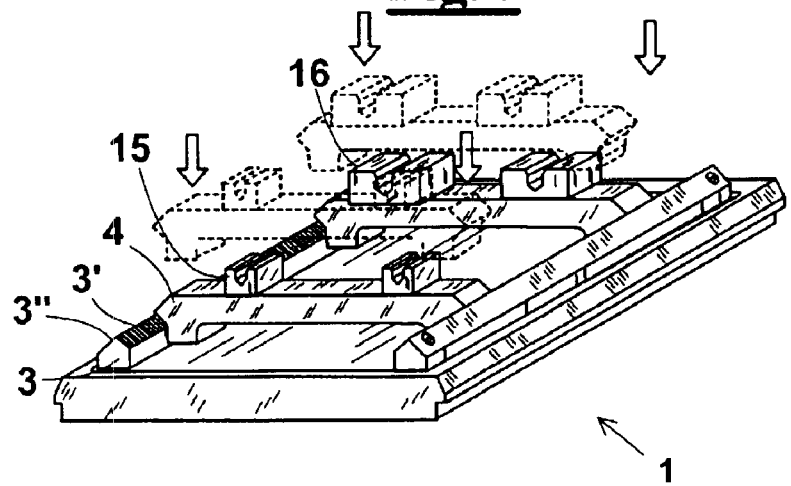

With reference to FIGS. 9, 10, and 11, starting from a situation where bridge 4 is fixed steadily to plate 2 of pallet 1 by means of magnets 7, it is necessry to raise it orthogonal to reference bar 3, beyond the force of magnets 7 on plate 2. Then, bridge 4 is moved parallel to reference bar 3 and located at a predetermined point.

Finally, a final movement substantially orthogonal for approaching bridge 4 to plate 2 of pallet 1 is necessary for completing the adjustment step.

In the final position bridge 4 is steady; in fact, magnet 7 blocks bridge 4 to plate 2 of pallet 1 in addition to the positive engagement of face 3' of reference bar 3 against face 6 of bridge 4, which are knurled and prevent it from sliding.

The location of bridge 4 with respect to reference bar 3 can be carried out also manually using a scale.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. A workpiece carrier for a pallet (1), having at least two support elements (15,16) for workpieces (20) comprising:
   two parallel reference bars (3), fixed to the pallet (1);
   two fastening bridges (4) substantially orthogonal to said bars (3), having a central portion, on which said support elements (15,16) are connected, and two ends (4') suitable for a boltless positive engagement (3', 6) with said bars (3), wherein said positive engagement (3', 6) is accomplished directly between said fastening bridges (4) and said bars (3) with no other fastening device, and wherein said bridges (4) have said ends (4') with an inclined face, and said bars (3) have an inclined surface, whereby the positive engagement (3', 6) is achieved when the inclined faces of the bridges (4) and the inclined surfaces of the bars (3) match with each others;
   the distance between said support elements (15,16) being adjustable by raising one of said bridges (4) from said bars (3), moving it to another position and lowering it again for completing the positive engagement (3', 6) with the bars (3) in the new position.

2. The workpiece carrier according to claim 1, wherein the faces of said bridges (4) ends have opposed inclination, and the surfaces of said bars (3) ends have opposed inclination, whereby said matching is self-centring.

3. A workpiece carrier for a pallet (1), having at least two support elements (15,16) for workpieces (20) comprising:
   two parallel reference bars (3), fixed to the pallet (1);
   two fastening bridges (4) substantially orthogonal to said bars (3), having a central portion, on which said support elements (15,16) are connected, and two ends (4') suitable for a boltless positive engagement (3', 6) with said bars (3), wherein said positive engagement (3',6) is accomplished directly between said fastening bridges (4) and said bars (3) with no other fastening device, and wherein said bridges (4) have said ends (4') with means for preventing the undesired lifting of said bridges (4) from said bars (3);
   the distance between said support elements (15,16) being adjustable by raising one of said bridges (4) from said bars (3), moving it to another position and lowering it again for completing the positive engagement (3', 6) with the bars (3) in the new position.

4. The workpiece carrier according to claim 3, wherein said means for preventing from the undesired lifting of said bridges (4) at said ends (4') are chosen among:
   at least a magnet (7) for fastening said ends (4') at the base of the pallet (1), said base being of ferromagnetic material;
   spring loaded pushing elements, balls, pins or rollers engaging in corresponding recesses provided in said bars (3) and said ends (4') of the bridges (4);
   reversible snap engagement elements.

5. A workpiece carrier for a pallet (1), having at least two support elements (15,16) for workpieces (20) comprising:
   two parallel reference bars (3), fixed to the pallet (1), wherein said reference bars (3) have an engagement surface with protrusions and recesses;
   two fastening bridges (4) substantially orthogonal to said bars (3), having a central portion, on which said support elements (15,16) are connected, and two ends (4') suitable for a boltless positive engagement (3', 6) with said bars (3), wherein said positive engagement (3', 6) is accomplished directly between said fastening bridges (4) and said bars (3) with no other fastening device, and wherein said bridges (4) have ends (4') with faces also with protrusions and recesses, whereby the positive engagement (3', 6) is achieved with the engagement of said protrusions and recesses;
   the distance between said support elements (15,16) being adjustable by raising one of said bridges (4) from said bars (3), moving it to another position and lowering it again for completing the positive engagement (3', 6) with the bars (3) in the new position.

6. The workpiece carrier according to claim 5, wherein said protrusions and recesses are a plurality of ribs and slits substantially orthogonal to the axis of said bars (3), the distance between two adjacent ribs or slits being a measuring unit of the movement of said bridges (4) with respect to said bars (3).

7. The workpiece carrier according to claim 5, wherein said protrusions and recesses can be chosen among: knurled, toothed, embossed, ribbed surfaces, as well as pins and holes.

8. A workpiece carrier for a pallet (1), having at least a couple of support elements (15,16) for workpieces (20) comprising:

two parallel reference bars (3), fixed to the pallet (1);

two fastening bridges (4) substantially orthogonal to said bars (3), having a central portion, on which said support elements (15,16) are connected, and two ends (4') suitable for a boltless positive engagement (3', 6) with said bars (3), wherein said positive engagement (3', 6) is accomplished directly between said fastening bridges (4) and said bars (3) with no other fastening device, and wherein said bridges (4) have central portions (3', 6) raised with respect to said pallet (1), whereby said workpieces (20) are suspended above said pallet (1) in order to accommodate workpieces (20) of different size;

the distance between said support elements (15,16) being adjustable by raising one of said bridges (4) from said bars (3), moving it to another position and lowering it again for completing the positive engagement (3', 6) with the bars (3) in the new position.

9. The workpiece carrier according to claim 1 wherein said bridges (4) have central portions (3', 6) raised with respect to said pallet (1), whereby said workpieces (20) are suspended above said pallet (1) in order to accommodate workpieces (20) of different size.

10. The workpiece carrier according to claim 2 wherein said bridges (4) have central portions (3', 6) raised with respect to said pallet (1), whereby said workpieces (20) are suspended above said pallet (1) in order to accommodate workpieces (20) of different size.

11. The workpiece carrier according to claim 3 wherein said bridges (4) have central portions (3', 6) raised with respect to said pallet (1), whereby said workpieces (20) are suspended above said pallet (1) in order to accommodate workpieces (20) of different size.

12. The workpiece carrier according to claim 4 wherein said bridges (4) have central portions (3', 6) raised with respect to said pallet (1), whereby said workepieces (20) are suspended above said pallet (1) in order to accommodate workpieces (20) of different size.

13. The workpiece carrier according to claim 5 wherein said bridges (4) have central portions (3', 6) raised with respect to said pallet (1), whereby said workpieces (20) are suspended above said pallet (1) in order to accommodate workpieces (20) of different size.

14. The workpiece carrier according to claim 6 wherein said bridges (4) have central portions (3', 6) raised with respect to said pallet (1), whereby said workpieces (20) are suspended above said pallet (1) in order to accommodate workpieces (20) of different size.

15. The workpiece carrier according to claim 7 wherein said bridges (4) have central portions (3', 6) raised with respect to said pallet (1), whereby said workpieces (20) are suspended above said pallet (1) in order to accommodate workpieces (20) of different size.

16. A workpiece carrier for a pallet (1), having at least two support elements (15,16) for workpieces (20) comprising:

two parallel reference bars (3), fixed to the pallet (1);

two fastening bridges (4) substantially orthogonal to said bars (3), having a central portion, on which said support elements (15,16) are connected, and two ends (4') suitable for a boltless positive engagement (3', 6) with said bars (3), wherein said positive engagement (3', 6) is accomplished directly between said fastening bridges (4) and said bars (3) with no other fastening device, and wherein said bridges (4) have at least a through hole, and said support elements (15,16) have snap fastening means engaging in the hole of said bridges (4);

the distance between said support elements (15,16) being adjustable by raising one of said bridges (4) from said bars (3), moving it to another position and lowering it again for completing the positive engagement (3', 6) with the bars (3) in the new position.

17. The workpiece carrier according to claim 1 wherein said bridges (4) have at least a through hole, and said support elements (15,16) have snap fastening means engaging in the hole of said bridges (4).

18. The workpiece carrier according to claim 2 wherein said bridges (4) have at least a through hole, and said support elements (15,16) have snap fastening means engaging in the hole of said bridges (4).

19. The workpiece carrier according to claim 3 wherein said bridges (4) have at least a through hole, and said support elements (15,16) have snap fastening means engaging in the hole of said bridges (4).

20. The workpiece carrier according to claim 4 wherein said bridges (4) have at least a through hole, and said support elements (15,16) have snap fastening means engaging in the hole of said bridges (4).

21. The workpiece carrier according to claim 5 wherein said bridges (4) have at least a through hole, and said support elements (15,16) have snap fastening means engaging in the hole of said bridges (4).

22. The workpiece carrier according to claim 6 wherein said bridges (4) have at least a through hole, and said support elements (15,16) have snap fastening means engaging in the hole of said bridges (4).

23. The workpiece carrier according to claim 7 wherein said bridges (4) have at least a through hole, and said support elements (15,16) have snap fastening means engaging in the hole of said bridges (4).

24. The workpiece carrier according to claim 8 wherein said bridges (4) have at least a through hole, and said support elements (15,16) have snap fastening means engaging in the hole of said bridges (4).

25. The workpiece carrier according to claim 9 wherein said bridges (4) have at least a through hole, and said support elements (15,16) have snap fastening means engaging in the hole of said bridges (4).

26. The workpiece carrier according to claim 10 wherein said bridges (4) have at least a through hole, and said support elements (15,16) have snap fastening means engaging in the hole of said bridges (4).

27. The workpiece carrier according to claim 11 wherein said bridges (4) have at least a through hole, and said support elements (15,16) have snap fastening means engaging in the hole of said bridges (4).

28. The workpiece carrier according to claim 12 wherein said bridges (4) have at least a through hole, and said support elements (15,16) have snap fastening means engaging in the hole of said bridges (4).

29. The workpiece carrier according to claim 13 wherein said bridges (4) have at least a through hole, and said support elements (15,16) have snap fastening means engaging in the hole of said bridges (4).

30. The workpiece carrier according to claim 14 wherein said bridges (4) have at least a through hole, and said support elements (15,16) have snap fastening means engaging in the hole of said bridges (4).

31. The workpiece carrier according to claim 15 wherein said bridges (4) have at least a through hole, and said support elements (15,16) have snap fastening means engaging in the hole of said bridges (4).

* * * * *